United States Patent
Pyla (10) Patent No.: US 9,705,833 B2
(45) Date of Patent: Jul. 11, 2017

(54) EVENT DRIVEN DYNAMIC MULTI-PURPOSE INTERNET MAIL EXTENSIONS (MIME) PARSER

(71) Applicant: International Business Machines Corporation, Armonk, NY (US)

(72) Inventor: Jagadeesh Reddy Pyla, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 14/243,036

(22) Filed: Apr. 2, 2014

(65) Prior Publication Data

US 2015/0288638 A1  Oct. 8, 2015

(51) Int. Cl.
G06F 15/16 (2006.01)
H04L 12/58 (2006.01)
G06Q 10/10 (2012.01)

(52) U.S. Cl.
CPC .......... *H04L 51/18* (2013.01); *G06Q 10/107* (2013.01)

(58) Field of Classification Search
USPC ....................................................... 709/206
See application file for complete search history.

(56) References Cited

U.S. PATENT DOCUMENTS

| | | |
|---|---|---|
| 7,219,299 B2 | 5/2007 | Fields et al. |
| 7,584,251 B2 | 9/2009 | Brown et al. |
| 8,214,439 B2 | 7/2012 | Williams et al. |
| 2001/0042136 A1* | 11/2001 | Guedalia ............. G06Q 10/107 709/246 |
| 2006/0085505 A1 | 4/2006 | Gillum et al. |
| 2007/0130262 A1* | 6/2007 | Williams ............. G06Q 10/107 709/206 |
| 2008/0005315 A1 | 1/2008 | Lin et al. |
| 2008/0140783 A1* | 6/2008 | Williams ................ H04L 12/58 709/206 |
| 2008/0301320 A1* | 12/2008 | Morris ................... H04L 12/58 709/238 |
| 2009/0097495 A1* | 4/2009 | Palacharla ............ H04L 49/901 370/413 |
| 2009/0129747 A1* | 5/2009 | Casagrande ............. H04N 5/76 386/241 |

(Continued)

OTHER PUBLICATIONS

The Apache Software Foundation, "Entries tagged [mime]", https://blogs.apache.org/james/tags/mime, Sep. 24, 2013, pp. 1-2.

(Continued)

*Primary Examiner* — Ario Etienne
*Assistant Examiner* — SM Z Islam
(74) *Attorney, Agent, or Firm* — Teddi E. Maranzano (57) ABSTRACT

An event driven MIME parser is provided. Quantities (chunks) of MIME data are received from a client and parsed to identify the boundaries internal to the MIME data and to isolate the content body. If the MIME message is not completed parsing before the end of the current chunk of data is recognized, the parsed data is written to storage and linked together with other previously-parsed content bodies. When the next chunk of MIME data is received, i.e., an event is recognized at the parsing server, the content body is isolated from the new chunk of MIME data and appended to the previously linked together content bodies, and parsing continues.

20 Claims, 4 Drawing Sheets

(56) References Cited

U.S. PATENT DOCUMENTS

| | | | | |
|---|---|---|---|---|
| 2009/0150873 A1* | 6/2009 | Taneda | ................ | G06F 9/45508 |
| | | | | 717/148 |
| 2009/0185040 A1 | 7/2009 | Yang et al. | | |
| 2010/0162124 A1* | 6/2010 | Morris | .............. | G06F 17/30899 |
| | | | | 715/733 |
| 2014/0189262 A1* | 7/2014 | Dawson | ................ | G06F 3/0685 |
| | | | | 711/154 |
| 2014/0201720 A1* | 7/2014 | Tessier | ................ | G06F 9/45545 |
| | | | | 717/130 |

OTHER PUBLICATIONS

Hunny XStream MIME, "MimeParser.h File Reference", www.hunnysoft.com/xmime/doc_mime_parser_8h.html#_details, Sep. 24, 2013.

* cited by examiner

EVENT DRIVEN DYNAMIC MULTI-PURPOSE INTERNET MAIL EXTENSIONS (MIME) PARSER

FIELD

The present disclosure relates generally to the field of presentation processing of a document, and more particularly, to event driven dynamic Multi-Purpose Internet Mail Extensions (MIME) parsing.

BACKGROUND

MIME content is generally parsed assuming that the entire content is accessible, as in data input as a stream. Because of the continuous nature of stream data, the parser has access to data both forward and backward relative to the current position of the pointer in the stream. However, a thread that uses stream data to send MIME content to be parsed will block while waiting for a reply from the parser. A dynamic event-driven MIME parser assumes the future content is inaccessible. In this model, the MIME parser receives an interrupt, signaling that a block of MIME content is present for parsing. The thread sending the content does not need to block, but is free to continuing processing after receiving an acknowledgement that the MIME parser accepted the MIME content. When the MIME parser completes processing the MIME message, the result is queued for the thread to retrieve, and the thread is notified that the result is ready. In event driven models of data parsing, message parsing throughput may be increased, since the participating threads may continue to perform useful work in parallel with the MIME parser.

BRIEF SUMMARY

Among other things, event driven dynamic MIME parsing is provided. According to an embodiment of the invention, a method of parsing event driven dynamic Multi-purpose Internet Mail Extensions (MIME) content is provided. The method may include receiving, from a network layer, at least one quantity of MIME content for parsing, whereby the received MIME content comprises at least one boundary, at least one content body, and at least one header; identifying the at least one content body in the received at least one quantity of MIME content, whereby the at least one content body is delineated by the at least one boundary; parsing the at least one identified content body to isolate the at least one identified content body from the received MIME content, based on the at least one boundary; storing the at least one parsed content body, based on an end of the received quantity of MIME content being detected before the MIME message is complete; and appending the stored at least one parsed content body to successively received quantities of MIME content.

BRIEF DESCRIPTION OF THE SEVERAL VIEWS OF THE DRAWING

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Embodiments of the present invention will now be described with reference to the figures. FIGS. 1-4, depict an exemplary implementation for event driven dynamic Multi-Purpose Internet Mail Extensions (MIME) parsing.

Figure 1:
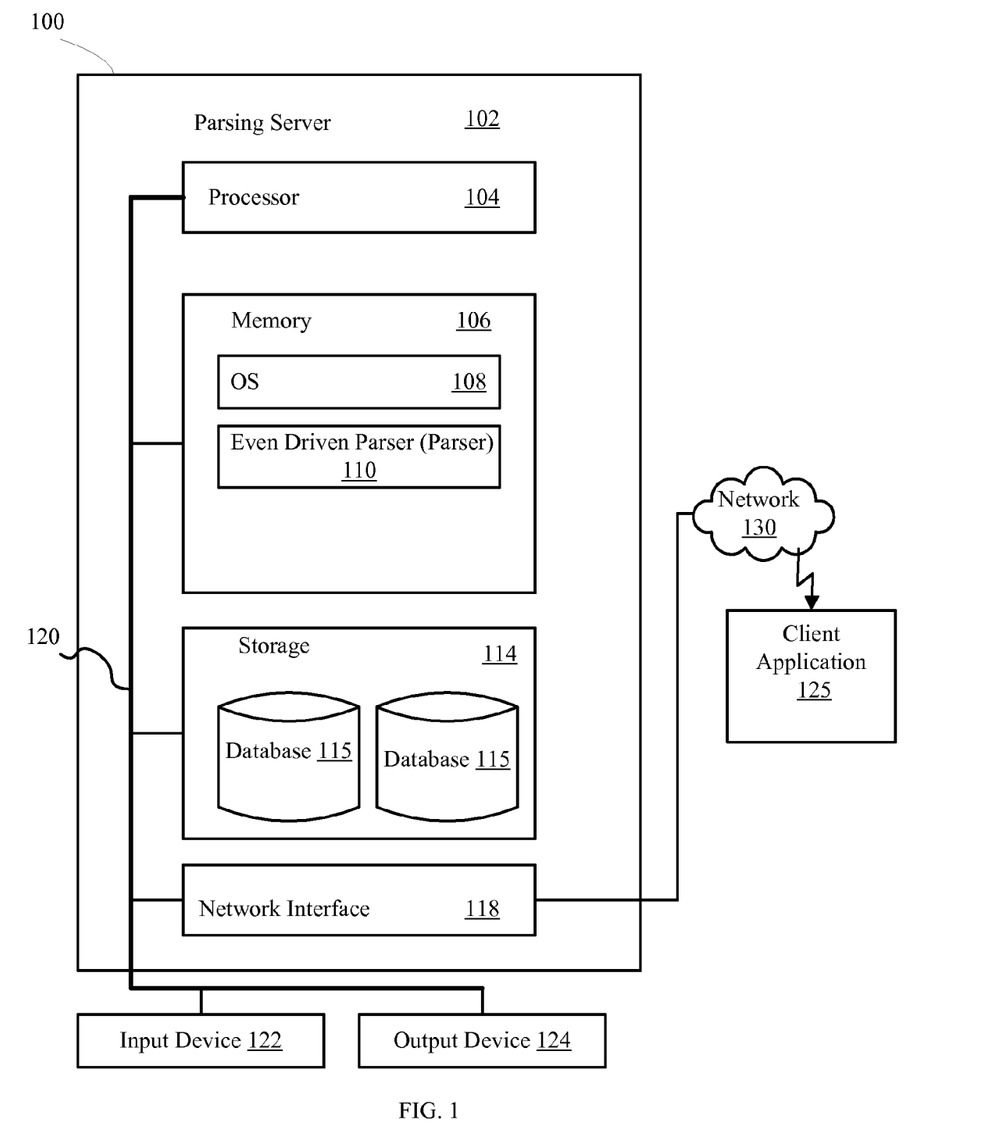
FIG. 1 illustrates an example of a system environment, according to an embodiment of the present disclosure.

FIG. 1 depicts an exemplary embodiment of a system 100 for event driven dynamic MIME parsing. The parsing server 102 generally includes a processor 104 connected via a bus 120 to a memory 106, a network interface device 118, a storage 114, an input device 122, and an output device 124. The parsing server 102 is generally under the control of an operating system 108, such as for example Linux. However, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger formats. The network interface device 118 may be any type of network communications device allowing the parsing server 102 to communicate with other computers via the network 130.

The storage 114 may be a combination of fixed persistent optical and/or solid state storage devices. The memory 106 and the storage 114 may be part of one virtual address space spanning multiple primary and secondary storage devices.

The input device 122 may be any device for providing input to the database server 102. For example, a keyboard and/or a mouse may be used. The output device 124 may be any device for providing output to a user of the parsing server 102. For example, the output device 116 may be any conventional display screen or set of speakers. Although shown separately from the input device 122, the output device 124 and input device 122 may be combined, as in a display screen with an integrated touch-screen.

As shown, the memory 106 of the parsing server 102 includes one or more software modules comprising the event driven parser 110 and configured to manage one or more databases 115, contained in the storage 114 of the parsing server 102.

The client application 125 may be configured as a separate workstation or other computer that is remote from the parsing server 102. In this context, remote refers to a client using a network connection, such as the network 130, to communicate with the parsing server 102.

The particular description in FIG. 1 is for illustrative purposes only; it should be understood that the invention is not limited to specific described embodiments, and any combination is contemplated to implement and practice the invention.

Figure 2:
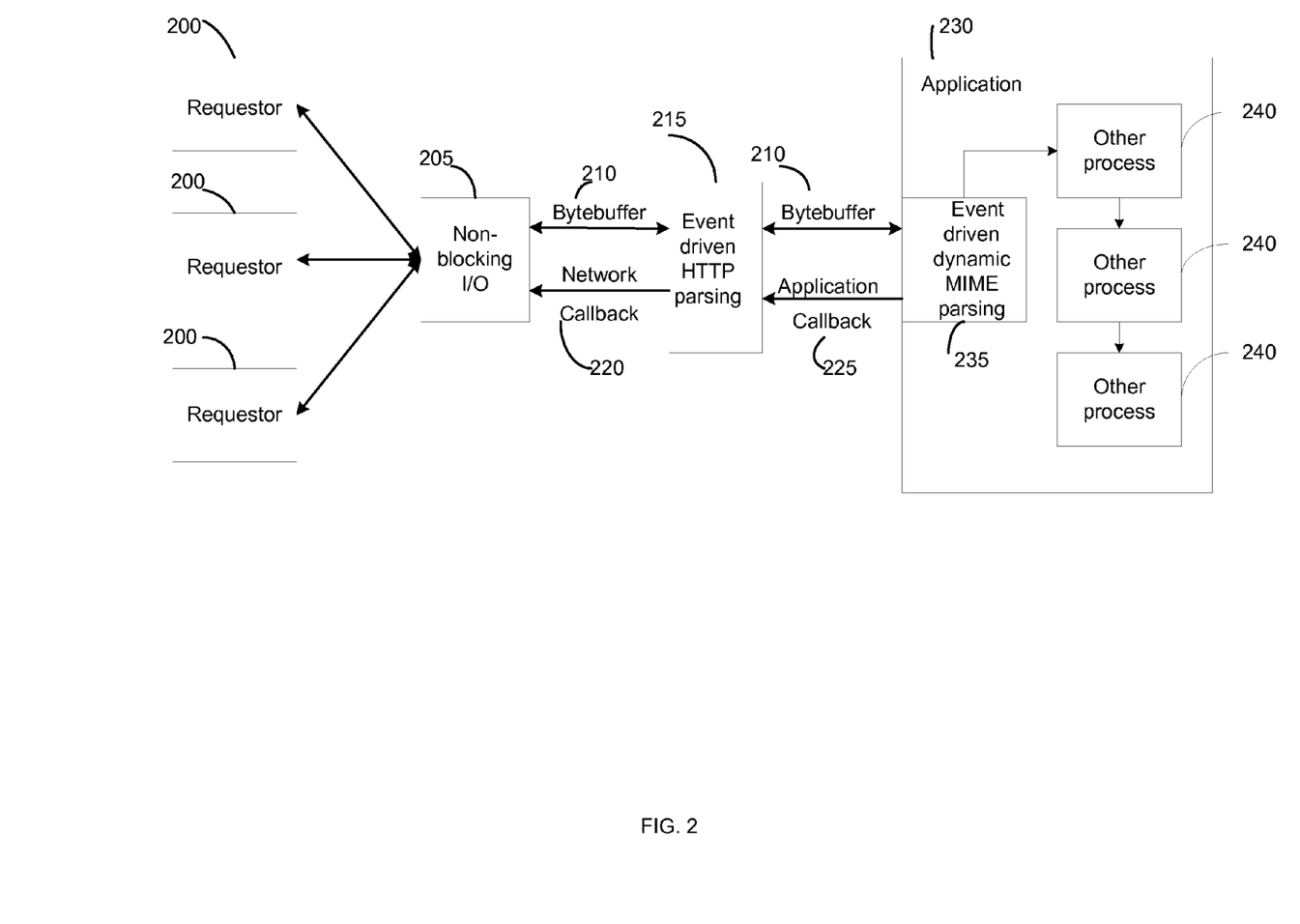
FIG. 2 is a schematic of a data flow between the requestor and the event driven dynamic MIME parser.

As shown in FIG. 2, several parsing requests 200 may be asynchronously placed on a non-blocking Input/Output (I/O) queue 205, for the MIME parser to process. A bytebuffer 210, which is an array where threads may exchange bytes of data, connects the non-blocking I/O queue 205 and event driven HTTP parsing (HTTP parsing) 215. Another bytebuffer 210 connects HTTP parsing 215 to the event driven MIME parsing (MIME parsing) 235 within the application 230. An application program interface (API) that is configured to read data from the bytebuffers 210 may control the amount of data needed during a read request by specifying the size of the bytebuffer 210, for example "10" KB. Subsequently on a callback, such as network callback 220, "10" KB of data will be packaged in the bytebuffer 210. In contrast, in traditional I/O streams processing data is continuously read and written, and an application which requires data, blocks (i.e., waits) on the availability of the network. MIME parsing 235 may report back status to HTTP parsing 215 over an application callback 225, established for the purpose of asynchronous communications between them. Similarly, HTTP parsing 215 may report back status to the non-blocking I/O queue 205 over the network callback 220. Parsed data may be returned to the requestors 200, over the application callback 225 and the network callback 220. Because MIME parsing 235 is event driven, i.e., through interrupts and callbacks, the MIME parsing architecture shown in FIG. 2 and described further in FIG. 3 may be integrated with any event driven application or computer system.

Figure 3:
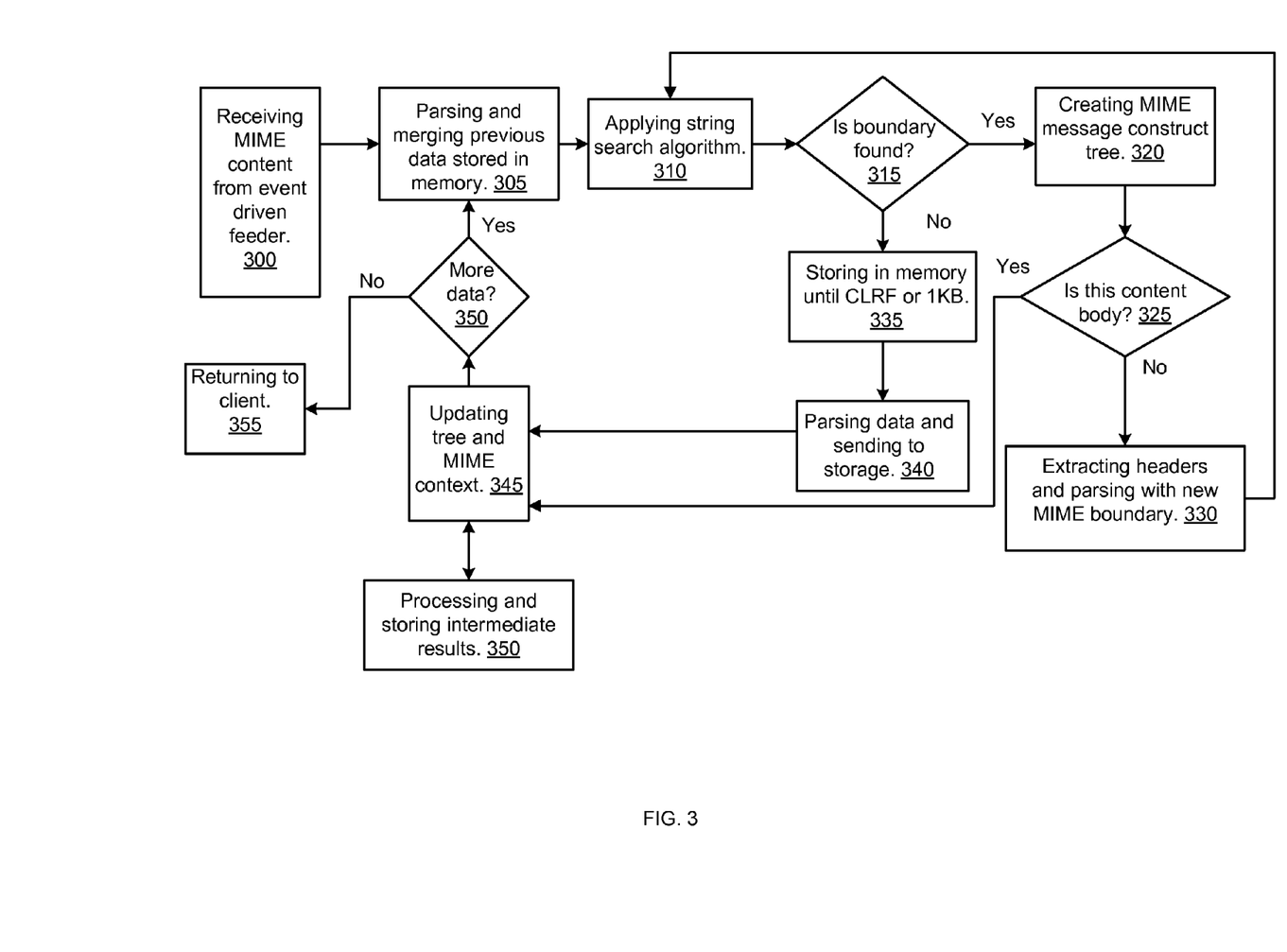
FIG. 3 depicts an exemplary embodiment of event driven dynamic MIME parsing according.

Referring now to FIG. 3, an exemplary flow of MIME parsing is illustrated. As described previously, a requestor 200 (FIG. 2) places a parsing request on a non-blocking I/O queue 205 (FIG. 2). HTTP parsing 215 (FIG. 2) notifies MIME parsing 235 (FIG. 2) that a request is queued for processing.

MIME parsing 235 (FIG. 2) receives MIME content from an event driven feeder, such as HTTP parsing 215 (FIG. 2), 300. In dynamic event driven MIME parsing, the MIME multi-part is subdivided into multiple MIME messages. Parsing is an iterative process, since for efficient utilization of computer memory and network bandwidth, the MIME multi-part is sent as chunks of content. Therefore, when HTTP parsing 215 (FIG. 2) interrupts MIME parsing 235 (FIG. 2) with a notification that another chunk of content is available, MIME parsing 235 (FIG. 2) may retrieve it. Chunks of content that have been previously parsed but stored, for example in external storage or memory, may be merged with the newly received chunk of content, 305. Storing a chunk of content may occur, for example, when a boundary is partially read, or not read at all, and the end of the chunk of content has been reached.

A MIME multi-part includes both data and metadata, which consists of HTTP-style headers and MIME boundary delimiters. Fields in the MIME header inform MIME parsing 235 (FIG. 2) how to parse the MIME multi-part. In particular, a CONTENT-TYPE field that contains the MULTIPART parameter indicates to MIME parsing 235 (FIG. 2) that the MIME multi-part contains more than one part, each separated by an ASCII boundary string, as specified in the BOUNDARY field. Using the fields in the header accompanying the MIME content, MIME parsing 235 (FIG. 2) applies a string pattern matching algorithm, such as Boyer-Moore, Knuth-Morris-Pratt, and Rabin-Carp, to locate the ASCII boundary string, 310.

Initially, MIME parsing 235 (FIG. 2) uses Boyer-Moore when the number of concurrent connections are low to medium, i.e., in the range of 100-200 concurrent connections per server. When the number of concurrent connections per server crosses a configurable boundary, MIME parsing 235 (FIG. 2) switches to Knuth-Morris-Pratt. In an embodiment, the configurable threshold has a default of 200 concurrent connections per server. MIME parsing 235 (FIG. 2) initially uses the Boyer-Moore algorithm but subsequently switches to Knuth-Morris-Pratt because the Boyer-Moore algorithm needs some previous state data to continue parsing the dynamically received data from network on a future call back. Although this state data may be a few bytes, it may reach "1" KB per connection. If there are many concurrent connections on the same server, to guard against the potential for high memory consumption, upon crossing the configurable threshold, MIME parsing 235 (FIG. 2) switches to the Knuth-Morris-Pratt algorithm. The Knuth-Morris-Pratt algorithm does not need previous state data for the same pattern being searched.

Boyer-Moore is faster since it needs to read less incoming data for parsing the content and identifying the MIME boundaries. It is considered sub-linear, since the Boyer-Moore algorithm does not require reading of all the input data. However, Knuth-Morris-Pratt is considered linear since reading all the input data is required to perform the MIME boundary parsing, and is therefore chosen over Boyer-Moore only when the number of connections per server crosses a threshold.

If the boundary is located, 315, a MIME message tree is constructed, 320, if this is the first chunk of MIME content being parsed. The MIME logical tree, also referred to as the MIME context, is a well-known structure that maintains, among other things, the state of MIME parsing 235 (FIG. 2), the current MIME message being parsed, the depth of the MIME message within the MIME multi-part, and other state information. A MIME message represents an individual entry in the MIME context which describes the MIME multi-part. The MIME messages are linked together in the MIME logical tree so that each MIME message is aware of its position within the tree, and whether it is a parent MIME message or a child MIME message. The MIME logical tree, as a whole, represents the structure of the MIME multi-part.

Other search algorithms may be used to determine whether what follows the boundary is content body, 325, which may include such types as binary, text, and image data. This allows MIME parsing 235 (FIG. 2) to discriminate between control structures, such as the boundary, and the actual message content. If content body is recognized, 325, the MIME context is updated, as is the location of the content body relative to other MIME messages within the MIME logical tree, 345. The intermediate results, 350, may be pushed to injectable (i.e., having an API) storage or other injectable processes, depending on the requirements of the application. For example, the application may be a mail server using MIME parsing 235 (FIG. 2) for parsing mail content. The mail server may want to store the parsed MIME messages in Network File System (NFS) storage for later use, and may also want to apply additional processing (e.g., 240 of FIG. 2), such as data decompression/compression or encoding/decoding. By injecting these additional processing components as MIME storage and processor APIs, MIME parsing 235 (FIG. 2) maintains flexibility without requiring modification to the event driven dynamic MIME parser program code. If content body is not recognized, 325, MIME parsing 235 (FIG. 2) extracts the new headers and MIME boundary, 330, and a string pattern matching algorithm is applied to locate and decode the ASCII boundary string, 310.

However, the ASCII boundary string may either be partially read or not read at all when the end of the chunk of content is reached, 315. In that case, the set of data from the present location in the chunk of content back to the previous Carriage Return Line Feed (CRLF) is kept in memory, 335. Alternatively, a configurable amount of data (i.e., 1 KB), may be kept memory. The remaining parsed content may be sent to external storage or processor, 340, and the MIME context is updated, 345. This tends to minimize the amount of data kept in memory for boundary matching when the next chunk of content arrives as a result of the next event.

If there is more data to parse, when the next chunk of data arrives, 350, the stored last set of data in the MIME context is appended to the buffer containing the new chunk of content, 350, and parsing continues. In this manner, parsing may be performed both recursively and dynamically, as content arrives, until the parsed MIME multi-part can be transmitted back to the requestor 200 (FIG. 2), 355.

Figure 4:
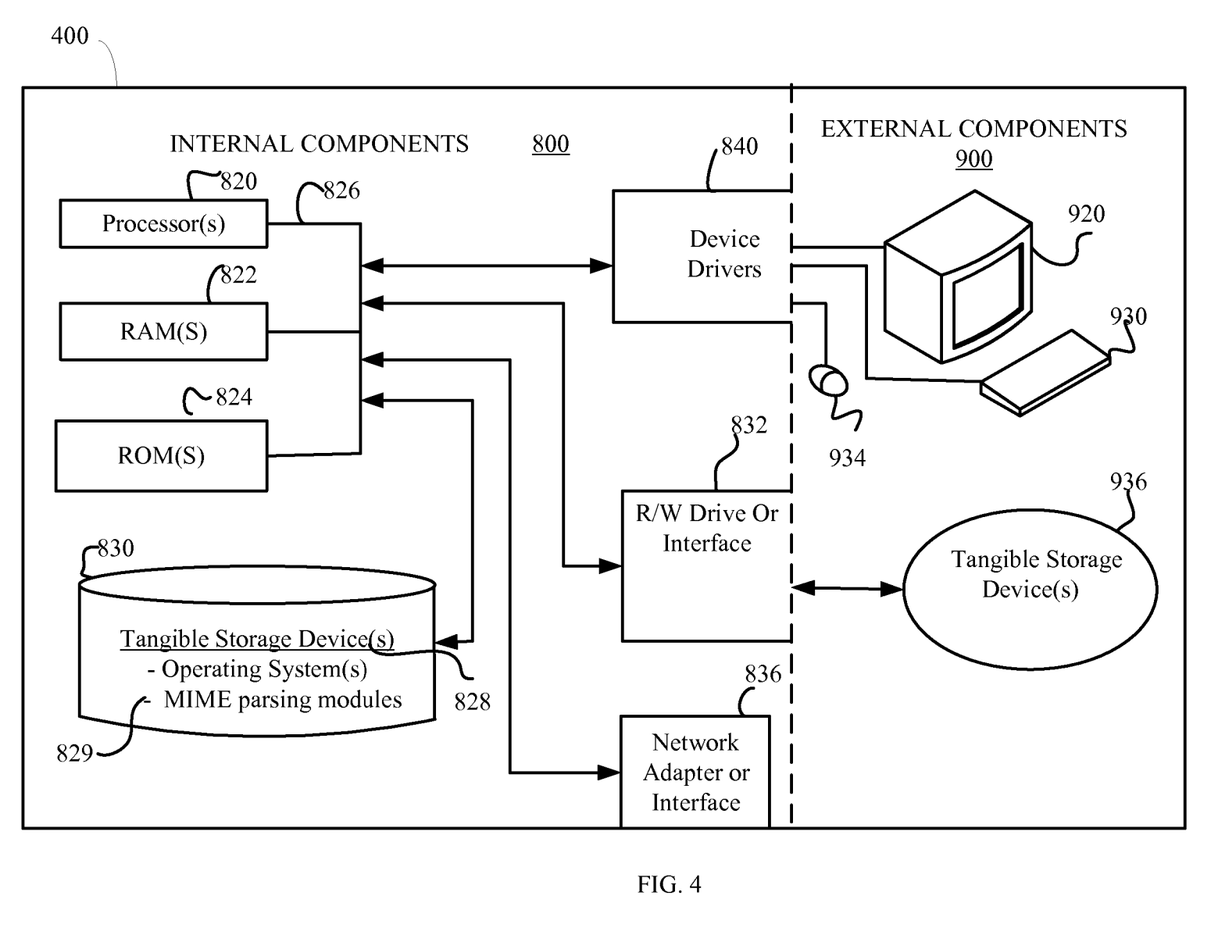
FIG. 4 is a schematic block diagram of hardware and software of the computer environment according to an embodiment of the method of FIG. 3.

Referring now to FIG. 4, computing device 400 may include respective sets of internal components 800 and external components 900 that together may provide an environment for a software application, such as a MIME content parser. Each of the sets of internal components 800 includes one or more processors 820; one or more computer-readable RAMs 822; one or more computer-readable ROMs 824 on one or more buses 826; one or more operating systems 828; one or more software applications (e.g., MIME parsing modules 829) executing the method of FIG. 3; and one or more computer-readable tangible storage devices 830. The one or more operating systems 828 and MIME parsing modules 829 are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The DBMS modules 829, and operating system 828 that are associated with computing device 400, can be downloaded to computing device 400 from an external computer (e.g., server) via a network (for example, the Internet, a local area network, or other wide area network) and respective network adapters or interfaces 836. From the network adapters (or switch port adapters) or interfaces 836 and operating system 828 associated with computing device 400 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method for parsing event driven dynamic multipurpose internet mail extensions (MIME) content comprising:
   receiving, into a first bi-directional bytebuffer by an event driven hyptertext transport protocol (HTTP) parser from a non-blocking input/output (I/O) queue, at least one quantity of MIME content of a multi-part MIME message for parsing wherein the received at least one quantity of MIME content comprises at least one boundary, at least one content body, and at least one header;
   identifying the at least one content body in the received at least one quantity of MIME content, wherein the at least one content body is delineated by the at least one boundary;
   parsing the at least one identified content body to isolate the at least one identified content body from the received quantity of MIME content, based on the at least one boundary;
   storing the at least one parsed content body, based on an end of the received quantity of MIME content being detected before the end of the multi-part MIME message is detected; and
   appending the stored at least one parsed content body to successively received quantities of MIME content.

2. The method of claim 1, wherein the receiving the at least one quantity of MIME content further comprises:
   receiving, into the first bi-directional bytebuffer by the event driven HTTP parser from the non-blocking I/O queue, the at least one quantity of MIME content, wherein:
      a network layer is connected to the non-blocking I/O queue;
      the non-blocking I/O queue and the event driven HTTP parser are connected to each other by the first bi-directional bytebuffer;
      the event driven HTTP parser asynchronously communicates with the non-blocking I/O using a network callback;
   sending, by the event driven HTTP parser, the received at least one quantity of MIME content through a second bi-directional bytebuffer to an event driven dynamic MIME parser within an application, wherein:
the event driven HTTP parser is connected to the event driven dynamic MIME parser by the second bi-directional bytebuffer;
the event driven MIME parser asynchronously communicates status and commands with the event driven HTTP parser using an application callback; and
receiving, by the event driven dynamic MIME parser, the asynchronous notification from the event driven HTTP parser that the at least one quantity of MIME content is in the second bi-directional bytebuffer.

3. The method of claim 1, wherein isolating the at least one identified content body from the received MIME content further comprises:
searching, by at least one injectable string pattern matching algorithm, the at least one quantity of MIME content for a first boundary string and a second boundary string, wherein the at least one injectable string pattern matching algorithm includes a Boyer-Moore algorithm, a Knuth-Morris-Pratt algorithm, and a Rabin-Carp algorithm and wherein the at least one injectable string pattern matching algorithm is called by the event driven dynamic MIME parser as an application program interface (API);
identifying the content body in the received MIME content, wherein the content body is delineated by the first boundary string and the second boundary string; and
transmitting the content body to an injectable process including a Network File System storage process, a data encoding/decoding process, a data decompression/compression process and injectable storage.

4. The method of claim 3, further comprising:
in response to the first boundary string or the second boundary string not being read, keeping in memory a portion of the parsed content body, wherein the portion is a configurable amount of the parsed content body that begins from the end of the received at least one quantity of MIME content backward to a previous Carriage Return Line Feed (CRLF);
storing in external storage a remaining portion of the parsed content body and updating a MIME context to include the location of the stored remaining portion of the parsed content body; and
in response to receiving an additional quantity of MIME content for parsing, appending the stored portion of the parsed content body to the bytebuffer containing the received other quantity of MIME content.

5. A computer program product for parsing event driven dynamic multi-purpose internet mail extensions (MIME) content comprising:
a non-transitory computer readable storage medium readable by a processing circuit and storing instructions for execution by the processing circuit for performing a method comprising:
receiving, into a first bi-directional bytebuffer by an event driven hyptertext transport protocol (HTTP) parser from a non-blocking input/output (I/O) queue, at least one quantity of MIME content of a multi-part MIME message for parsing wherein the received at least one quantity of MIME content comprises at least one boundary, at least one content body, and at least one header;
identifying at the least one content body in the received at least one quantity of MIME content, wherein the at least one content body is delineated by the at least one boundary;
parsing the at least one identified content body to isolate the at least one identified content body from the received quantity of MIME content, based on the at least one boundary;
storing the at least one parsed content body, based on an end of the received quantity of MIME content being detected before the end of the multi-part MIME message is detected; and
appending the stored at least one parsed content body to successively received quantities of MIME content.

6. The computer program product of claim 5, wherein the receiving the at least one quantity of MIME content further comprises:
receiving, into the first bi-directional bytebuffer by the event driven HTTP parser from the non-blocking I/O queue, the at least one quantity of MIME content, wherein:
a network layer is connected to the non-blocking I/O queue;
the non-blocking I/O queue and the event driven HTTP parser are connected to each other by the first bi-directional bytebuffer;
the event driven HTTP parser asynchronously communicates with the non-blocking I/O using a network callback;
sending, by the event driven HTTP parser, the received at least one quantity of MIME content through a second bi-directional bytebuffer to an event driven dynamic MIME parser within an application, wherein:
the event driven HTTP parser is connected to the event driven dynamic MIME parser by the second bi-directional bytebuffer;
the event driven MIME parser asynchronously communicates status and commands with the event driven HTTP parser using an application callback; and
receiving, by the event driven dynamic MIME parser, the asynchronous notification from the event driven HTTP parser that the at least one quantity of MIME content is in the second bi-directional bytebuffer.

7. The computer program product of claim 5, wherein isolating the at least one identified content body from the received MIME content further comprises:
searching, by at least one injectable string pattern matching algorithm, the at least one quantity of MIME content for a first boundary string and a second boundary string, wherein the at least one injectable string pattern matching algorithm includes a Boyer-Moore algorithm, a Knuth-Morris-Pratt algorithm, and a Rabin-Carp algorithm and wherein the at least one injectable string pattern matching algorithm is called by the event driven dynamic MIME parser as an application program interface (API);
identifying the content body in the received MIME content, wherein the content body is delineated by the first boundary string and the second boundary string; and
transmitting the content body to an injectable process including a Network File System storage process, a data encoding/decoding process, a data decompression/compression process and injectable storage.

8. The computer program product of claim 7, further comprising:

in response to the first boundary string or the second boundary string not being read, keeping in memory a portion of the parsed content body, wherein the portion is a configurable amount of the parsed content body that begins from the end of the received at least one quantity of MIME content backward to a previous Carriage Return Line Feed (CRLF);

storing in external storage a remaining portion of the parsed content body and updating a MIME context to include the location of the stored remaining portion of the parsed content body; and in response to receiving an additional quantity of MIME content for parsing, appending the stored portion of the parsed content body to the bytebuffer containing the received other quantity of MIME content.

9. The computer program product of claim 7, wherein: the injectable storage is at least one callable API corresponding to a data storage component; and the injectable process is at least one callable API corresponding to a program.

10. A computer system for parsing MIME content comprising one or more processors, one or more computer-readable storage devices, and a plurality of program instructions stored on at least one of the one or more storage devices for execution by at least one of the one or more processors, the plurality of program instructions comprising:

a computer readable storage medium readable by a processing circuit and storing instructions for execution by the processing circuit for performing a method comprising:

receiving, into a first bi-directional bytebuffer by an event driven hyptertext transport protocol (HTTP) parser from a non-blocking input/output (I/O) queue, at least one quantity of MIME content of a multi-part MIME message for parsing wherein the received at least one quantity of MIME content comprises at least one boundary, at least one content body, and at least one header;

identifying the at least one content body in the received at least one quantity of MIME content, wherein the at least one content body is delineated by the at least one boundary;

parsing the at least one identified content body to isolate the at least one identified content body from the received quantity of MIME content, based on the at least one boundary;

storing the at least one parsed content body, based on an end of the received quantity of MIME content being detected before the end of the multi-part MIME message is detected; and appending the stored at least one parsed content body to successively received quantities of MIME content.

11. The computer system of claim 10, wherein the receiving the at least one quantity of MIME content further comprises:

receiving, into the first bi-directional bytebuffer by the event driven HTTP parser from the non-blocking I/O queue, the at least one quantity of MIME content, wherein:

a network layer is connected to the non-blocking I/O queue;

the non-blocking I/O queue and the event driven HTTP parser are connected to each other by the first bi-directional bytebuffer;

the event driven HTTP parser asynchronously communicates with the non-blocking I/O using a network callback;

sending, by the event driven HTTP parser, the received at least one quantity of MIME content through a second bi-directional bytebuffer to an event driven dynamic MIME parser within an application, wherein:

the event driven HTTP parser is connected to the event driven dynamic MIME parser by the second bi-directional bytebuffer;

the event driven MIME parser asynchronously communicates status and commands with the event driven HTTP parser using an application callback; and receiving, by the event driven dynamic MIME parser, the asynchronous notification from the event driven HTTP parser that the at least one quantity of MIME content is in the second bi-directional bytebuffer.

12. The computer system of claim 10, wherein isolating the at least one identified content body from the received MIME content further comprises:

searching, by at least one injectable string pattern matching algorithm, the at least one quantity of MIME content for a first boundary string and a second boundary string, wherein the at least one injectable string pattern matching algorithm includes a Boyer-Moore algorithm, a Knuth-Morris-Pratt algorithm, and a Rabin-Carp algorithm and wherein the at least one injectable string pattern matching algorithm is called by the event driven dynamic MIME parser as an application program interface (API);

identifying the content body in the received MIME content, wherein the content body is delineated by the first boundary string and the second boundary string; and transmitting the content body to an injectable process including a Network File System storage process, a data encoding/decoding process, a data decompression/compression process and injectable storage.

13. The computer system of claim 12, further comprising: in response to the first boundary string or the second boundary string not being read, keeping in memory a portion of the parsed content body, wherein the portion is a configurable amount of the parsed content body that begins from the end of the received at least one quantity of MIME content backward to a previous Carriage Return Line Feed (CRLF);

storing in external storage a remaining portion of the parsed content body and updating a MIME context to include the location of the stored remaining portion of the parsed content body; and in response to receiving an additional quantity of MIME content for parsing, appending the stored portion of the parsed content body to the bytebuffer containing the received other quantity of MIME content.

14. The computer system of claim 12, wherein: the injectable storage is at least one callable API corresponding to a data storage component; and the injectable process is at least one callable API corresponding to a program.

15. The method of claim 2, wherein the event driven HTTP parser requests an additional quantity of MIME content from the non-blocking I/O queue in response to receiving a request from the event driven dynamic MIME parser in the application, and wherein status and commands between the event driven dynamic MIME parser, the event driven HTTP parser, and the non-blocking I/O queue occur asynchronously on a callback connection, and wherein parsed data is returned to a requestor through the first and the second bytebuffers.

16. The method of claim 3, wherein the event driven dynamic MIME parser invokes the Boyer-Moore algorithm when a number of concurrent connections is less than a configurable number of concurrent connections and wherein the event driven dynamic MIME parser invokes the Knuth-Morris-Pratt algorithm when the number of concurrent connections exceeds the configurable number of concurrent connections.

17. The computer program product of claim 6, wherein the event driven HTTP parser requests an additional quantity of MIME content from the non-blocking I/O queue in response to receiving a request from the event driven dynamic MIME parser in the application, and wherein status and commands between the event driven dynamic MIME parser, the event driven HTTP parser, and the non-blocking I/O queue occur asynchronously on a callback connection, and wherein parsed data is returned to a requestor through the first and the second bytebuffers.

18. The computer program product of claim 7, wherein the event driven HTTP parser requests additional quantity of MIME content from the non-blocking I/O queue in response to receiving a request from the event driven dynamic MIME parser in the application, and wherein status and commands between the event driven dynamic MIME parser, the event driven HTTP parser, and the non-blocking I/O queue occur asynchronously on a callback connection, and wherein parsed data is returned to a requestor through the first and the second bytebuffers.

19. The computer system of claim 11, wherein the event driven HTTP parser requests an additional quantity of MIME content from the non-blocking I/O queue in response to receiving a request from the event driven dynamic MIME parser in the application, and wherein status and commands between the event driven dynamic MIME parser, the event driven HTTP parser, and the non-blocking I/O queue occur asynchronously on a callback connection, and wherein parsed data is returned to a requestor through the first and the second bytebuffers.

20. The computer system of claim 12, wherein the event driven dynamic MIME parser invokes the Boyer-Moore algorithm when a number of concurrent connections is less than a configurable number of concurrent connections and wherein the event driven dynamic MIME parser invokes the Knuth-Morris-Pratt algorithm when the number of concurrent connections exceeds the configurable number of concurrent connections.

* * * * *